United States Patent [19]

Watanabe

[11] Patent Number: 4,497,072
[45] Date of Patent: Feb. 5, 1985

[54] POROUS COATED GLOVE

[75] Inventor: Hiroshi Watanabe, Kurume, Japan

[73] Assignee: Towa Glove Co., Ltd., Kurume, Japan

[21] Appl. No.: 442,374

[22] Filed: Nov. 17, 1982

[30] Foreign Application Priority Data

Nov. 24, 1981 [JP] Japan .............................. 56-189480

[51] Int. Cl.³ .............................................. A41D 19/00
[52] U.S. Cl. ...................................... 2/161 A; 2/167; 2/168; 2/169
[58] Field of Search ................ 2/161 A, 167, 168, 169

[56] References Cited

U.S. PATENT DOCUMENTS

| | | | |
|---|---|---|---|
| 2,058,221 | 10/1936 | Ferguson | 2/168 |
| 2,083,684 | 6/1937 | Burke | 2/168 |
| 2,393,298 | 1/1946 | De Laney et al. | 2/168 |
| 4,172,293 | 10/1979 | Vistins | 2/167 X |
| 4,270,228 | 6/1981 | Gaiser | 2/168 X |
| 4,283,244 | 8/1981 | Hashmi | 2/168 X |

Primary Examiner—Louis K. Rimrodt
Attorney, Agent, or Firm—Birch, Stewart, Kolasch & Birch

[57] ABSTRACT

A porous glove for use especially by workers and motorcyclists made of fabric material with a coating layer, the coating layer has sharp projections in the shape of broken bubbles whereby the glove provides tenacious grip. In addition, a method for making the improved porous glove is provided.

11 Claims, 4 Drawing Figures

POROUS COATED GLOVE

BACKGROUND AND FIELD OF THE INVENTION

This invention relates to an improved glove having the surface coated with a rubber or resin such as vinyl resin and the like. The present invention specifically relates to a glove which is adapted for use by persons who ride a motorcycle or whose work requires the carrying of packages and other handiworks.

Gloves having resin coatings such as rubber and vinyl resin on the surface of a woven fabric glove or knitted fabric are known. A coated glove having projections on the palm portion to prevent slipping is also known.

However, these known coated gloves do not allow air penetration through the coated materials, and hence the hand covered thereby will perspire. In order to prevent this drawback, a glove having no coating layer on the back portion thereof has been proposed. This glove though has only limited use because the glove does not prevent liquid penetration through the back of the glove.

A coated glove subjected to fine perforation treatment by needles has also been devised in order to provide air penetration and ventilation. However, this glove not only has poor air penetration since the flexible and resilient coated material tends to close the perforated holes, but the glove also tends to tear through the hole portions. Moreover, it is technically difficult to perforate finger and back portions of a molded glove in order to mechanically form fine holes. On the other hand, large perforated holes in a glove permit the invasion of dust, sand and the like into the inside of the glove and hence the glove is not suitable for handiworks.

Furthermore, previous resin coated gloves which have projections on the surface do not have projections which are of suitable size and shape and the edges of these projections are not sharp so that the gloves do not always give a tenacious grip.

OBJECTS AND SUMMARY OF THE INVENTION

It is, therefore, an object of the present invention to provide an improved glove of knitted or woven material having applied thereto a coating of resin, which assures adequate ventilation, and a method of making the same.

It is another object of the present invention to provide an improved glove coated with resin which has a gripping or frictional surface, and a method of making the same.

These and other objects of the present invention are accomplished by providing a porous glove and a method of making the same wherein the glove is made of a fabric material with a coating layer. The coating layer has sharp projections in the shape of broken bubbles whereby the glove provides an excellent and tenacious grip for use especially by workers and motorcyclists.

These and other objects and advantages of the present invention will become apparent from the description hereinafter which is directed to the preferred embodiment thereof. The glove and method of making same which are shown in the accompanying drawings are presented by way of example only and are not intended to be restrictive as regards this new and novel method and the article produced thereby.

A more particular description of the invention will be given with respect to the accompanying drawings, wherein:

DETAILED DESCRIPTION OF THE INVENTION

Figure 1:
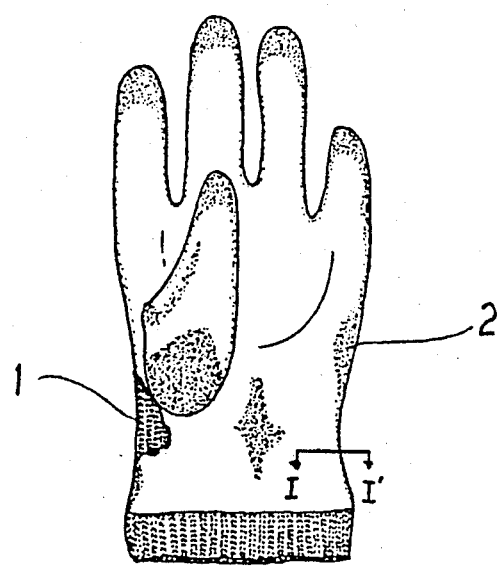
FIG. 1 is a front elevational view, with a portion thereof being broken away, of the glove of the present invention.
Figure 2:
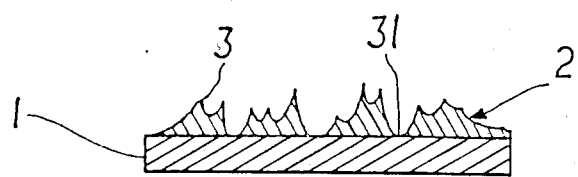
FIG. 2 is an enlarged cross-sectional view taken along line I—I' of FIG. 1.

Referring first to FIGS. 1 and 2, there is provided a glove prepared according to the invention. It will be noted that FIGS. 1 and 2 illustrate a glove made from a knitted fabric glove base 1 having a surface with a resin layer 2. The resin layer 2 has projections 3, the ends of which have sharp edges and a broken bubble shape.

The fabric glove base 1 may be formed from knitted or woven materials made from staple fibers, synthetic fibers, cotton or any other fabrics to allow for air penetration and ventilation. The base 1 may be preferably formed from materials capable of absorbing moisture.

The resin layer 2 and the projections 3 in the shape of broken bubbles thereon may be applied on at least the palm portion of the glove, but are preferably provided on the entire surface of the glove. It has been found that the resin 2 may be a natural resin such as natural rubber latex or a synthetic resin such as polyvinyl chloride, polyvinyl acetate, polyurethane or the like as the main substance.

Figure 4:
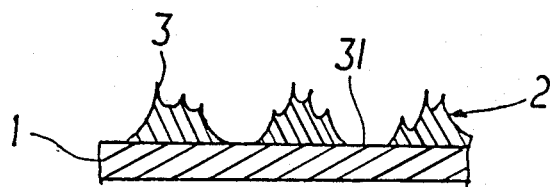
FIG. 4 is an enlarged cross-sectional view showing a coated resin layer having broken bubbles thereon, which is made from the coated layer in FIG. 3.

The fabric glove base 1 may be coated by dipping or immersing the glove into a foaming resin solution containing latex, plastisol, organosol in a solution having many small bubbles which are about 0.2 to 2 mm in diameter. Preferably, the glove base 1 is coated by a thin layer of solution. The base 1 may then be pulled out from the foaming resin solution and the bubbles in the coated resin layer 2 are broken under reduced pressure sufficient to cause the bubbles to burst. Subsequently, the coated glove is subjected to heat treatment and the glove surface is thereby provided with projections 3 in the shape of broken bubbles. To provide the best coating layer, the viscosity of the solution of resin 2 is preferably 500 cp wherein the bubbles in the resin are breakable. The solution of resin 2 includes a varying scale of bubble sizes. Hence, the breaking of a large bubble results in a depression 31 in the form of a crater which is formed at the fabric glove base 1 at that position. On the other hand, the breaking of a small bubble results in the formation of sharp projections 3 in the shape of a broken bubble and a small crater reaching only partially down into the surface of the resin 2. This structure is best shown in FIGS. 2 and 4 wherein the glove base 1 has a resin layer 2 with an irregular upper surface containing numerous projections 3 and a plurality of depressions 31 forming resin layer-free portions of the glove base 1. The projections 3 thus give the glove excellent grip characteristics while the depressions 31 allow for good air ventilation through the glove.

The mechanism of the present invention is not clear but the following mechanism has been suggested. Because a part of the liquid phase of the resin layer 2 contains a diluent which penetrates into the fabric glove base 1, the decreasing concentration of the liquid phase of the resin 2 causes the bubbles to burst.

After the bubbles break, the portion of the solution of resin 2 which has a higher viscosity forms continuous barbed elevations along the outline of the bubbles by a coagulation process. Then, the vaporization and exhalation of the diluent by heating cause the elevations to shrink; that is, the heat treatment causes a formation of a plurality of thin barbs from a single initial thick elevation.

Figure 3:
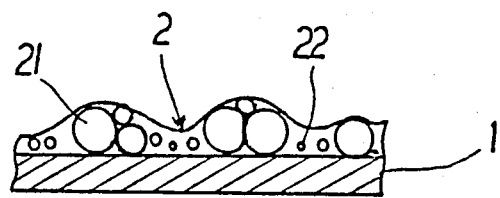
FIG. 3 is an enlarged cross-sectional view showing a fabric surface coated by a resin solution.

In order to form higher projections 3, it is preferable that a suitable amount of rough or coarse particles of resin 22 and other materials 21 be added to the resin solution. The size of the rough particles can vary but the size should be selected such that the particles do not rapidly precipitate or separate out of the resin solution. When the resin solution containing rough particles 21 and 22 of varying size is coated onto a glove base 1 as shown in FIGS. 3 and 4, the coefficients of absorption and coagulation can cause projections in the shape of broken bubbles which have high elevation and sharp barbs.

As described above, the instant invention provides a method including the steps of coating a resin solution containing many small bubbles onto a glove base formed of yarn which permits air penetration and ventilation, thereafter breaking said small bubbles under reduced pressure and forming gripping projections in the shape of broken bubbles with sharp edges. Therefore, a glove prepared according to the present invention has the most important benefit that it permits natural air penetration and ventilation and does not have the drawback of poor air penetration which is characteristic of the previous back-uncoated gloves.

Moreover, the present glove presents slippage against a force in any direction and the projections of the glove have proper elasticity and toughness because the glove has gripping projections in the form of a continuous network and because the broken bubbles and projections are sharp. Accordingly, in the case of gripping a wet object, the projections of the glove may tear the layer of water on the surface of the wet object, so that, the glove will directly touch the gripped object. Moreover, as described above, the bottoms of small broken bubbles do not reach to the fabric glove base and therefore form sucker-shaped depressions so that the glove can provide a tenacious grip with its sharp projections.

Recently, there has been an increase in the number of motorcycle traffic accidents attributable to the misoperation of a motorcycle handle caused by poor handle grip in the rain. However, the glove prepared according to the present invention has a resin layer which has projections in the shape of a continuous network on the fabric glove, so that, the glove is pliable and flexible and yet also has a strong resistance against slippage. In addition, many packaging cartons are now provided with a resin coating for waterproofing. While previous gloves do not give a tenacious grip on these coated cartons, the glove of this invention can provide sufficient grip on these cartons so that it may prevent workers that handle such cartons from becoming tired and may thereby prevent accidents.

Previous coated gloves have had a resin layer on the entire glove surface, so that rigidity of the gloves impaired the maneuverability of the glove wearer. However, in the case of a glove prepared according to this invention, many bottoms of the broken bubbles extend to the glove fabric base so that the glove has less resin whereby the rigidity of the glove is decreased. Therefore, the glove of this invention can provide the same feel as a usual uncoated fabric glove.

The following example is given for the purpose of illustrating the method of manufacturing the coated glove encompassed by the present invention. It is to be understood that the present invention is not to be unduly limited beyond the scope and spirit of the appended claims, by the conditions or materials employed in this example. FIGS. 1 and 4 and the data presented with the example will indicate the benefits to the afforded through the utilization of the present invention.

EXAMPLE 1

A suitable resin dip formulation formation is as follows:

| Material | parts by weight |
| --- | --- |
| HX - M (emulsion polymerization paste type polyvinyl chloride, 170 mesh, Sumitomo Chemical Co., Ltd.) | 80 |
| SX - D (suspension polymerization type polyvinyl chloride, 40 mesh, Sumitomo Chemical Co., Ltd.) | 20 |
| Dibutyl phthalate (plasticizer, Kyowahakko Co., Ltd.) | 50 |
| Dioctyl phthalate (plasticizer, Sekisui Chemical Co., Ltd.) | 100 |
| KP - 270A (calcium-barium type stabilizer, Kyodo Yakuhin Co., Ltd.) | 4 |
| SH - 1250 (silicone foam controller, Toray silicone) | 12 |
| Diobase (aliphatic hydrocarbon diluent, Esso Co., Ltd.) | 70 |

The dip solution (300 cp) containing the above material was foamed by a stirrer. A glove made of knitted cotton yarn was dipped into the dip solution. After sufficient adhesion of resin solution onto the glove, the glove having a coated layer thereon was drawn up from the dip solution and placed in a sealed vacuum container. Then, bubbles in the coated solution were broken under 400 mm/Hg by a vacuum pump. Subsequently, the glove was heated for 20 minutes at 185° C. to provide a glove for handiwork which has good air penetration and ventilation and sharp projections in the shape of broken bubbles.

What is claimed is:

1. A porous hand covering comprising a fabric glove base and a rubber or resin coating layer thereon, said coating layer including gripping projections projecting outward from said glove base and a plurality of depressions in said coating layer wherein said depressions form coating layer-free areas on said glove base whereby the portions of said glove base containing said depressions permit air penetration and ventilation to the inside of said glove and provide said glove with flexibility.

2. The porous hand covering of claim 1, wherein said fabric glove base is formed from a material selected from the group consisting of knitted fabrics, woven fabrics, staple fiber materials, synthetic fiber fabrics and cotton fabrics.

3. The porous hand covering of claim 1, wherein said coating layer is selected from the group consisting of a natural resin and a synthetic resin.

4. The porous hand covering of claim 3, wherein said synthetic resin is a member selected from the group consisting of polyvinyl chloride, polyvinyl acetate and polyurethane.

5. The porous hand covering of claim 1, wherein said coating layer is a natural rubber latex.

6. A method for making a porous hand covering comprising a fabric glove base and a coating layer coated thereon, said method comprising the steps of:
   (a) coating a fabric glove base with a foaming solution of rubber or resin;
   (b) subjecting the thus produced coated glove base to reduced pressure sufficient to cause the bubbles to burst; and
   (c) heat treating the glove to shape and cure the coating layer thereby forming a coating layer with gripping projections projecting outward from said glove base and a plurality of depressions in said coating layer wherein said depressions form coating layer-free areas on said glove base.

7. The method according to claim 6, wherein said glove base is dipped or immersed into said foaming solution.

8. The method according to claim 6, wherein said foaming solution contains bubbles of about 0.2 to about 2.0 mm in diameter.

9. The method according to claim 6, wherein said foaming solution has a viscosity of about 500 cp.

10. The method according to claim 6, wherein said foaming solution contains rough particles to provide larger grip projections.

11. The method according to claim 6, wherein said reduced pressure to step (b) is about 400 mm/Hg.

* * * * *